(12) United States Patent
Guering

(10) Patent No.: US 9,079,666 B2
(45) Date of Patent: Jul. 14, 2015

(54) SECURED VESTIBULE TO THE COCKPIT OF AN AIRCRAFT AND AIRCRAFT EQUIPPED WITH SUCH AN ACCESS DOOR

(71) Applicant: Airbus Operations (SAS), Toulouse (FR)

(72) Inventor: Bernard Guering, Montrabe (FR)

(73) Assignee: Airbus Operations (S.A.S.), Toulouse (FR)

( * ) Notice: Subject to any disclaimer, the term of this patent is extended or adjusted under 35 U.S.C. 154(b) by 246 days.

(21) Appl. No.: 13/857,378

(22) Filed: Apr. 5, 2013

(65) Prior Publication Data

US 2013/0292513 A1 Nov. 7, 2013

Related U.S. Application Data

(63) Continuation of application No. PCT/FR2011/000548, filed on Oct. 10, 2011.

(30) Foreign Application Priority Data

Oct. 8, 2010 (FR) ..................................... 10 58197

(51) Int. Cl.
*B64D 11/00* (2006.01)
*B64C 1/14* (2006.01)
*B64D 45/00* (2006.01)
*E06B 3/90* (2006.01)

(52) U.S. Cl.
CPC .......... *B64D 11/0023* (2013.01); *B64C 1/1469* (2013.01); *B64D 45/0015* (2013.01); *E06B 3/903* (2013.01)

(58) Field of Classification Search
None
See application file for complete search history.

(56) References Cited

U.S. PATENT DOCUMENTS

| 3,658,277 | A  | * | 4/1972 | Anderson | 244/1 R |
| 6,375,562 | B1 | * | 4/2002 | Hein | 454/188 |
| 6,470,512 | B1 | * | 10/2002 | Lau et al. | 4/612 |
| 6,601,797 | B2 | * | 8/2003 | Sheremeta | 244/118.5 |

(Continued)

FOREIGN PATENT DOCUMENTS

| EP | 0 383 709 | | 2/1990 |
| EP | 1332965 A1 | | 8/2003 |

(Continued)

OTHER PUBLICATIONS

International Search Report for Application No. PCT/FR2011/000548 (WO 2012/045931) dated Apr. 12, 2012.

(Continued)

*Primary Examiner* — Christopher P Ellis
*Assistant Examiner* — Medhat Badawi
(74) *Attorney, Agent, or Firm* — Jenkins, Wilson, Taylor & Hunt, P.A.

(57) ABSTRACT

The invention relates to a secure access airlock enabling the communication between several rooms of an aircraft, the secure airlock being installed in an area of the aircraft between a first room and at least one second room, characterized in that it includes two mobile partitions provided in the form of portions of concentric cylinders, each of the partitions being capable of being moved, separately from one another, about a common axis, so as to provide a single opening therebetween which makes it possible to access either of the rooms, the two partitions being capable of moving over two concentric cylinders having different diameters.

15 Claims, 6 Drawing Sheets

(56) References Cited

U.S. PATENT DOCUMENTS

| | | | |
|---|---|---|---|
| 6,925,756 B2 * | 8/2005 | Roessner et al. | 49/42 |
| 7,249,737 B2 * | 7/2007 | Simmons et al. | 244/129.5 |
| 7,959,453 B2 * | 6/2011 | Guering | 439/165 |
| 8,398,026 B2 * | 3/2013 | Walton et al. | 244/129.5 |
| 8,627,601 B2 * | 1/2014 | Farrell | 49/41 |
| 8,925,863 B2 * | 1/2015 | Pujol et al. | 244/118.5 |
| 2003/0146347 A1 | 8/2003 | Roessner | |
| 2004/0089766 A1 * | 5/2004 | Semprini | 244/118.5 |
| 2005/0230550 A1 * | 10/2005 | Dominguez | 244/129.5 |
| 2006/0032977 A1 | 2/2006 | Simmons et al. | |
| 2010/0219292 A1 * | 9/2010 | Saint-Jalmes et al. | 244/118.5 |

FOREIGN PATENT DOCUMENTS

| | | |
|---|---|---|
| NL | 1 019 944 | 8/2003 |
| RU | 2307909 C2 | 10/2007 |
| WO | WO 2006/015457 | 2/2006 |

OTHER PUBLICATIONS

Chinese Office Action for Application No. 2011/80048066.2 dated Dec. 15, 2014.

Chinese Search Report for Application No. 2011/80048066.2 dated Dec. 13, 2014.

* cited by examiner

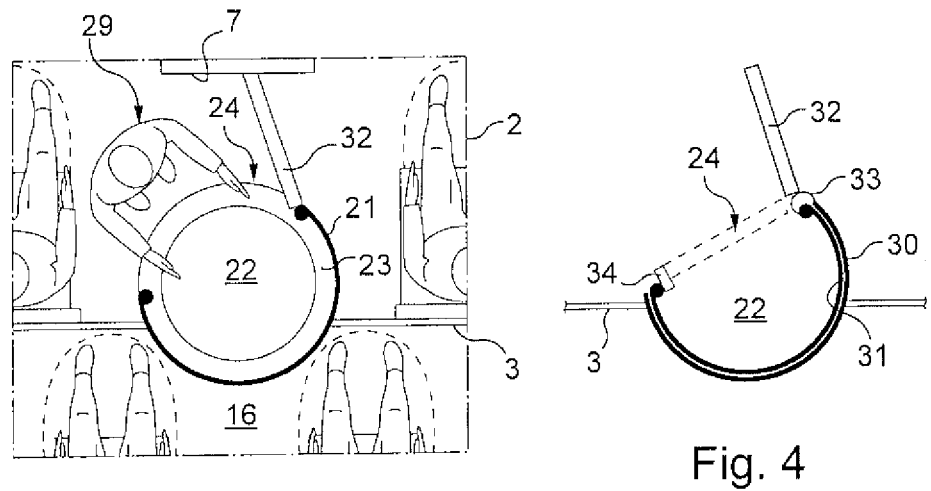
Fig. 3
Fig. 4
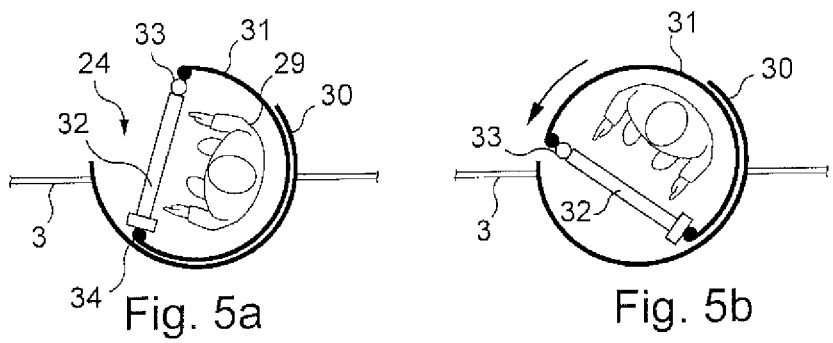
Fig. 5a    Fig. 5b
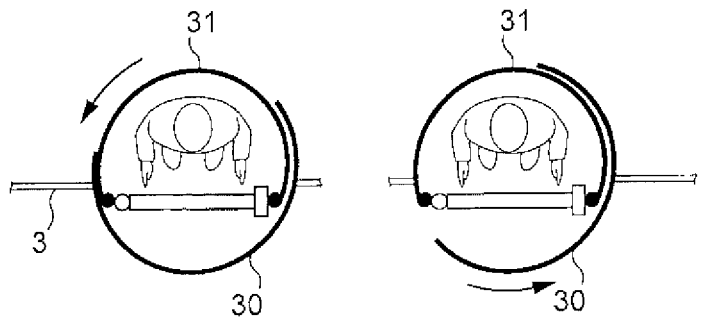
Fig. 5c    Fig. 5d
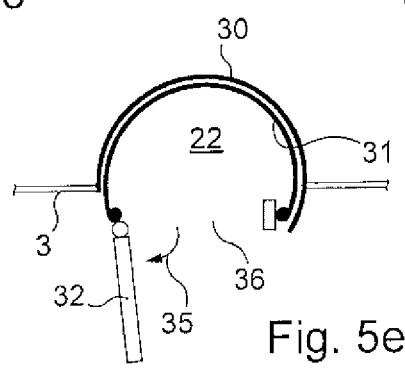
Fig. 5e

SECURED VESTIBULE TO THE COCKPIT OF AN AIRCRAFT AND AIRCRAFT EQUIPPED WITH SUCH AN ACCESS DOOR

CROSS-REFERENCE TO RELATED APPLICATIONS

This application is a continuation of PCT Application Serial No. PCT/FR2011/000548, filed Oct. 10, 2011, which claims priority to French Patent Application Serial No. 1058197, filed Oct. 8, 2010, the entire contents of which are both incorporated by reference herein.

TECHNICAL FIELD

The present invention relates to a secured vestibule to the cockpit of an aircraft. It also relates to an aircraft equipped with such an access door.

BACKGROUND

It is known in the state of the art to use an armoured door controlling the passage between the cockpit and the cabin of an airliner so as to protect the crew from malicious acts by a passenger. However, such a system does not prevent the intrusion of malicious persons into the cockpit when a member of the crew is leaving it.

In general terms, it would be beneficial to be able to increase security in the cockpit or, more generally, when a person wishes to pass from a first compartment to at least a second compartment of an aircraft. It would also be beneficial to have available a solution for secure access from a first compartment to at least a second compartment of an aircraft that is relatively compact and does not unduly encroach on the available space in one of the compartments.

A subject of the invention is a secured vestibule allowing communication between several aircraft compartments, the secured vestibule being installed in an area of the aircraft situated between a first compartment and at least a second compartment, characterized in that it comprises two mobile partitions (30, 31) in the form of concentric portions of cylinders, each of the partitions being capable of independent movement about a common axis (41), so as to form between them a single opening (24, 36) which, depending on the relative position of the partitions, gives access to one or other of the compartments, the two partitions being capable of moving on two concentric cylinders having different diameters.

An opening for access to a compartment is created by means of a simple movement of the partitions in relation to each other.

The concentric arrangement of the partitions allows the space requirement of the access door to be reduced and the relative movement of the partitions takes place within the volume defined by said concentric arrangement. Thus, the use of the secured vestibule to allow a person to move from a first compartment to a second compartment encroaches on the available space in the second compartment only to a limited extent or not at all.

Moreover, inasmuch as the partitions pivot on themselves and there is no longer a door to be opened onto the inner space of the second compartment, the risk of a malicious person hiding close to the door when it is closed, and behind it when it is open, is eliminated or in any case greatly reduced.

The movement of the partitions is for example a rotational movement about the common axis. The cylindrical portions are arranged concentrically about said axis.

It will be noted that more than two compartments can be served by the access door and thus be connected two by two.

The access door is for example arranged in a wall separating two compartments from each other or within a set of several walls separating more than two compartments (2, 3, 4 etc.) from each other.

SUMMARY

According to another aspect, the invention relates to a secured vestibule allowing communication between several aircraft compartments, the access door being installed in an area of the aircraft situated between a first compartment and at least one second compartment, characterized in that it comprises at least one partition mobile in rotation about an axis of rotation and having the form of a cylindrical portion defining, on the one hand, an inner space inside the secured vestibule and, on the other hand, an opening between the inside and the outside of the access door, the rotation of said at least one partition allowing access from a first compartment to a second compartment.

The portion of cylinder extends in a radial plane (perpendicular to the axis of the cylinder), through more than 180° in order to block the area (e.g. wall) between the two compartments where the access door is installed.

It will be noted that the rotational movement is broken down so that the opening to allow passage through the access door is firstly positioned opposite the first compartment. Then, when an occupant has entered the secured vestibule, the rotational movement can start again (providing that the space situated in the second compartment is free to access, i.e. safe; this can be checked by means of a video surveillance system composed of one or more cameras displaying the second compartment and a monitoring screen placed in the access door and/or in the first compartment) and the partition turns on itself in order to position the opening opposite the second compartment.

For example, the present invention relates to a secured vestibule to the cockpit of an aircraft that is installed in a separating wall between the cockpit and the cabin of the aircraft.

The cabin space reserved for passenger seating is thus retained and a portion of the cockpit space is used, that in the state of the art must remain available to allow passage through the usual door.

The access door secures access to the cockpit and also access from the cockpit to the cabin.

The access door allows for example access between the cockpit and the cabin or between the cockpit and a rest room or toilets or between several of these compartments (for example between a rest room and the cabin).

According to other aspects of the invention, singly or in combination:

the partitions are capable of describing a range of movement extending through 360°; an advantage of this arrangement is the simplification of the construction and installation of the access door which comprises two mobile walls only without the need to install (an) additional fixed wall(s) to separate the two compartments. Another advantage of this arrangement is the ability to adjust the angular orientation of the opening of the access door allowing access to one of the compartments through 180°, both on the first compartment side and on the second compartment side. This ability to regulate or adjust the angular orientation of the opening is useful for example in the event that a trolley or cart is located in the cabin aisle opposite the access door and would obstruct exit from the access door in the direction of the aisle;

the portions of cylinders each extend through an angular sector of more than 180°; an advantage of this arrangement is to block the area between the two compartments where the access door is installed;

the access door comprises a double wall closing off access to the first compartment or the second compartment depending on the position of the mobile partitions with respect to the compartments; an advantage of this arrangement is to further secure access to one and/or the other of the compartments (e.g. to the cockpit or to the cabin);

the mobile partitions can be entirely operated by a user; an advantage of this arrangement is that it is not necessary to motorize the access door, thus offering a saving in terms of on-board weight; moreover, the operation of the access door is thus particularly straightforward.

the mobile partitions are linked to support means permitting independent rotational movements of each partition about the common axis.

the support means of the mobile partitions comprise at least one cylindrical base or ring that is capable of turning about the common axis of the access door with respect to a floor or a ceiling of the aircraft; an advantage of this arrangement is that it makes it possible to free the central area of the access door, for example on the floor, and to avoid adding the weight of the occupant to the weight of the mobile portion of the access door (ring). In the central area of the access door the occupant stands on a fixed floor and therefore his weight is not supported by the access door. The construction of the access door is thus simplified. Moreover, such an arrangement allows to the occupant of the access door to guide the rotation of the partitions of the access door in rotation in an entirely intuitive manner. If on the other hand, the occupant were inside an access door mounted on a pivot, he would be unable to make the access door turn, as once the access door was closed, he would have no fixed point of reference. The access door would then need to be motorized. In a possible embodiment, the access door comprises two turning bases or rings placed at the two opposite ends of the access door (top and bottom ends). These bases or rings are guided by guide means (e.g. rollers) with bearings, providing circular guidance and bearing the access door. The lower base or ring surrounds a central area formed by the original floor of the aircraft.

said at least one cylindrical ring is mobile in rotation with respect to the floor and/or the ceiling using guide and/or bearing rollers fixed to the floor or the ceiling; an advantage of this arrangement is that it facilitates the installation and removal of the access door which can therefore easily be adapted to a conventional aircraft environment. Once the access door has been removed, a conventional aircraft environment is present once again with no special floor and a conventional door can then be installed in the partition separating the cockpit from the cabin in place of the secured vestibule;

one of the mobile partitions is capable of moving with respect to said at least one cylindrical ring using guide means joined together with said ring; an advantage of this arrangement is that it allows the relative rotational movement of one of the partitions with respect to the other partition;

the access door comprises first and second mobile partitions which engage with means for locking their rotational movements about the common axis, the locking means being activated by control means ensuring that only a single partition is rendered mobile until the access opening to one of the compartments is completely clear; an advantage of this arrangement is that it prevents an individual passing through the access door without the access door passing through a completely closed state;

one of the mobile partitions is equipped with a articulation making it possible to fix a plate in an articulated manner to the access door and to deploy said plate outside the access door or to fold it back towards the access door; an advantage of this arrangement is that a portion of the volume occupied by the access door is recovered; the articulation is for example placed on the edge of the cylindrical portion of one of the mobile partitions which is for example a so-called inner partition;

the plate is a support plate comprising a seat allowing a crew member present in one compartment (e.g. the cockpit) or in another compartment (e.g. the passenger cabin) to be seated; additional seating capacity for a crew member is thus added in one of the compartments;

the seat is joined together with the support plate using tracks and/or articulations allowing its height and/or vertical tilt to be adjusted; an advantage of this arrangement is to make it possible to use the access door as accommodation allowing a crew member to relax, both on one compartment side (e.g. the cockpit) and on another compartment side (e.g. the passenger cabin);

at least one of the mobile partitions is provided with support elements distributed heightwise over the partition in order to allow access to an escape hatch in the upper part of the access door (e.g. cockpit ceiling); an advantage of this arrangement is to make it possible to evacuate a compartment (e.g. cockpit) or to transfer an emergency team thereto, in particular on the ground, without the need to pass through another compartment such as the passenger cabin;

at least one of the mobile partitions is equipped with a grasping member, for example, a grasping ring, making it possible to rotate said partition from the inner closed space of the access door formed by the two partitions; an advantage of this arrangement is that it makes it possible to operate the access door manually from the inner space thereof.

According to yet further possible features, singly or in combination:

the first mobile partition is fixed to the cylindrical ring of the support means by fixing means distributed on the periphery of the first mobile partition and of the cylindrical ring;

the second mobile partition rests on the cylindrical ring via guide means that provide its rotational movement;

rollers guiding the rotational movement of the cylindrical ring are in contact with an inner and/or outer wall of the cylindrical ring, parallel to the axis of rotation of the access door;

bearing rollers of the cylindrical ring are in contact with a portion of the cylindrical ring arranged in a plane normal to the common axis of rotation of the access door;

the guide means of the second mobile partition, which are joined together with said at least one cylindrical ring, comprise a plurality of rollers having axes parallel to the common axis of rotation;

the plurality of rollers is joined together with the portion of the cylindrical ring arranged in a plane normal to the common axis of rotation of the access door and arranged on either side of the thickness of said second mobile partition on at least a portion of its periphery;

the guide means of the second mobile partition comprise a plurality of rollers having axes that are radial with respect to the common axis of rotation of the access door and are mounted on an element supporting the second partition, thus allowing the partition to be run on the cylindrical ring by means of said element;

the cylindrical ring comprises a grooved track positioned on the portion of the cylindrical ring arranged in a plane normal to the axis of rotation of the access door, opposite the element supporting the second mobile partition, in which the rollers can run.

The invention also relates to an aircraft incorporating at least one secured vestibule according to the invention.

BRIEF DESCRIPTION OF THE DRAWINGS

Other features and advantages of the present invention will be better understood in the light of the description and of the attached drawings, in which:

FIG. 3 shows a diagrammatic top view of an access door according to an embodiment of the present invention;

FIG. 4 shows a functional diagram of the access door in FIG. 3;

FIGS. 5a to 5e show successive positions of the access door in FIG. 4;

DETAILED DESCRIPTION

Figure 1:
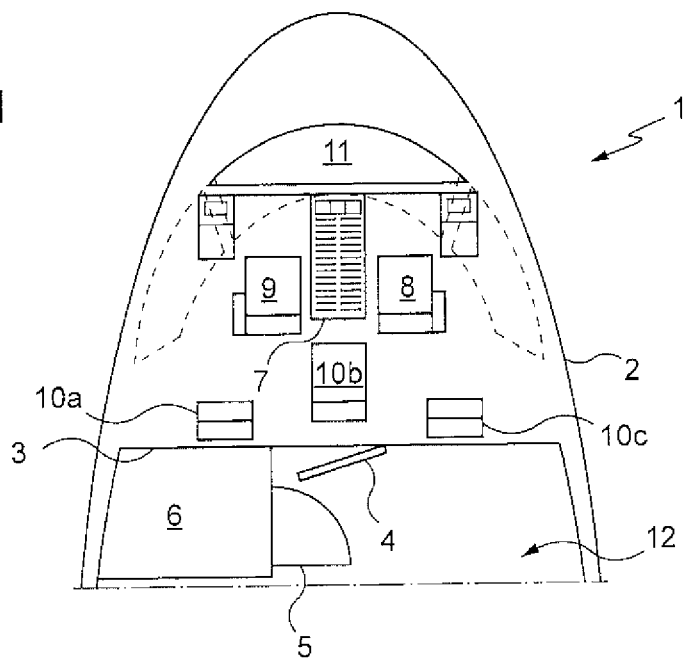
FIG. 1 shows the method of access to the cockpit of an airliner according to the state of the art.

FIG. 1 shows a top view of an aircraft such as an airliner 1 comprising a cockpit 2 and a passenger cabin 12. The cockpit and the passenger cabin are separated by an armoured wall 3 in the centre of which an armoured door 4 is arranged. The armoured door allows to the crew to pass from the cockpit 2 to the cabin 12 and vice-versa and, if necessary, to lock the door so as to protect access.

The cockpit 2 contains an instrument panel with navigation instruments 11 arranged under a canopy and two pilot seats 8 and 9 separated by a pilot's console 7. Seats 10a, 10b and a jump seat 10c are moreover arranged in the cockpit.

It is noted that in this arrangement the door 4 opens onto the aisle of the cabin. However, opening the door 4 requires at least one row of passenger seating to be cleared. It is also known to have available toilets 6 provided with a door 5.

When a crew member wishes to leave the cockpit, he can consult an image of the entrance to the cabin 12 using a video surveillance camera and a panoramic monitoring screen arranged in the cockpit. However, a problem with said state of the art lies in the fact that the crew member is unable to repel a sudden attack by a passenger initially positioned close to the door 4. Once the attack has taken place, the armoured door 4 is open and there is free access to the cockpit 2.

It is known to use access doors controlling access to a protected area, for example on the ground, for protecting banking organizations. In these arrangements, an armoured secured vestibule is placed around the access opening. It is then possible to check from within the access door the access rights or a security condition of the entrant before validating opening.

Figure 2:
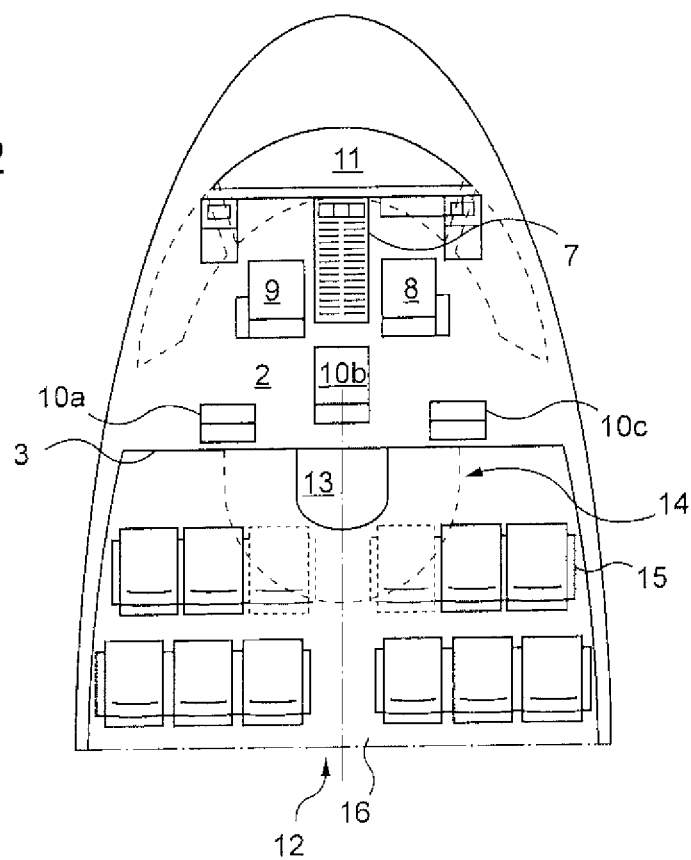
FIG. 2 shows a possible access arrangement using a known access door of the state of the art.

FIG. 2 shows a design for the siting of such an access door in a conventional airliner. The cockpit 2 is identical to that in FIG. 1 and bears the same reference numbers which will not be repeated. The cabin 12 is provided with an aisle 16 and of two rows of seating such as the seating 15. An access door 13 is arranged along the central axis, in the extension of the aisle 16. However, it is noted that a perimeter 14 for access to the door is required, which occupies space for the seats in the first row closest to the aisle. Of course, removing such seats reduces the operating profit of such an airliner.

FIG. 3 shows a top view in which the operation of the secured vestibule of the invention is shown. In the for example central opening made in the armoured separating wall 3 between the space of the cockpit 2 and the space of the passenger cabin 12 a generally cylindrical access door is arranged. The access door is principally composed of a mobile ring 23 bearing at least one mobile partition 21. The mobile partition 21 is a vertical portion of cylinder, the axis of the cylinder being common with the vertical axis of the cylindrical ring 23. A central space 22 is defined inside the rotatable access door in particular by the partition 21 and remains permanently fixed during the rotational movements of the access door and of its ring 23 about the aforementioned vertical axis. An opening 24 is created by removing the portion of cylinder completing the cylindrical portion of the mobile partition 21 in order to form a complete cylinder. Via this opening 24, a crew member 29 can gain access from the cockpit to the central space 22 of the secured vestibule of the invention. It will be noted that the portion of cylinder extends in a radial plane through an angular sector greater than 180° in order to completely block passage through the wall in which the access door is installed.

When the crew member 29 wishes to access the passenger cabin 12 from the cockpit 2, he operates the access door without the need for any motorization so as to place the opening 24 on the cockpit side. He then enters the access door, in the central space 22. He then notes on a panoramic screen monitoring the passenger cabin if the aisle 16 is clear. Once this check has been carried out, he manually pivots the access door about its common vertical axis, turning the mobile partition 21 on the mobile cylindrical ring 23.

FIG. 4 shows an explanatory diagram of the aforementioned operation. In the embodiment in FIG. 4, the secured vestibule comprises two concentric mobile partitions: an outer partition 30 and an inner partition 31 which are fixed and/or mobile with respect to the cylindrical ring. The mobile partitions 30 and 31 are arranged in place of the mobile partition 21 shown in FIG. 3. In this example, the two partitions extend through an identical angular sector greater than 180° for the same reasons as those mentioned above.

The partitions are arranged and move over two concentric cylinders (in a top view projection forming two circles) having different diameters.

The range of movement of the partitions over these cylinders is unlimited and can take place through 360° in order to give maximum flexibility to the operation of the access door, and in particular to the opening position (angular orientation of the opening).

It will be noted in this regard that no other partition, for example a fixed partition, is required to constitute the access door.

In an embodiment, the inner mobile partition 31 bears a plate 32 mounted on a articulation 33. Said plate, as will be explained below, makes it possible to recover the volume used by the access door. The plate 32 can be articulated between a deployed position outside the access door in order to allow entry into the access door or exit therefrom (position in solid lines in FIG. 4) and a closed position (position in dashed lines on FIG. 4) blocking access to the access door. The plate 32 constitutes a support plate that can for example bear a jump seat so that, when the support plate 32 is pivoted to reach the position indicated by dashed lines in FIG. 4, a crew member can sit on the jump seat. In this position the plate 32 is locked on the partition 31 by locking means 34 known per se.

The jump seat and its support plate can be folded back (i.e. placed in a position freeing the opening 24) when a crew member wishes to access the central space 22 of the secured vestibule. It will be noted that the jump seat is optional.

FIGS. 5*a* to 5*e* show five successive states of the mobile partitions 30, 31 when the secured vestibule is operated by an occupant. Before the situation shown in FIG. 5*a*, the occupant 29 previously folded back the support plate 20 on the outer edge of the inner mobile partition 31 of the access door (as in FIG. 4). He then entered the central space 22 of the access door via the opening 24 and closed the jump seat support plate 20 on its latch 34. Grasping the upper part of the plate 20, the user 29 then rotates the inner mobile partition 31 only about the common central axis of the access door, as shown in FIG. 5*b*.

When the jump seat support plate 20 is substantially parallel to the armoured wall 3 (FIG. 5*c*), control means (not shown) actuate latches (also not shown) so that the outer mobile partition 30 is unlocked, while the inner mobile partition 31 is locked in order to prevent its rotational movement (FIG. 5*d*).

The occupant 29 inside the access door then rotates the outer mobile partition 30 so as to clear the opening 36 on the passenger cabin side. When this opening 36 is completely clear (FIG. 5*e*), the outer mobile partition 30 is locked again. The user can then unlock the mobile support plate 20 and pivot it about its articulation, as indicated by the arrow 35, so as to clear the passage of the opening 36. The occupant can then pass from the inside 22 of the access door to the passenger cabin.

It will be noted from FIG. 5*e* (and inversely in FIG. 4), that as the two partitions 30, 31 are arranged in top view on concentric circles of different diameters, access to one or other of the two zones of the aircraft can be blocked by both partitions (double wall), giving the access door additional security.

Of course, the reverse movement wherein a crew member wishes to pass from the passenger cabin to the cockpit is carried out in an identical manner, in the reverse order of the aforementioned steps, and will not be further described hereinafter.

Figure 6:
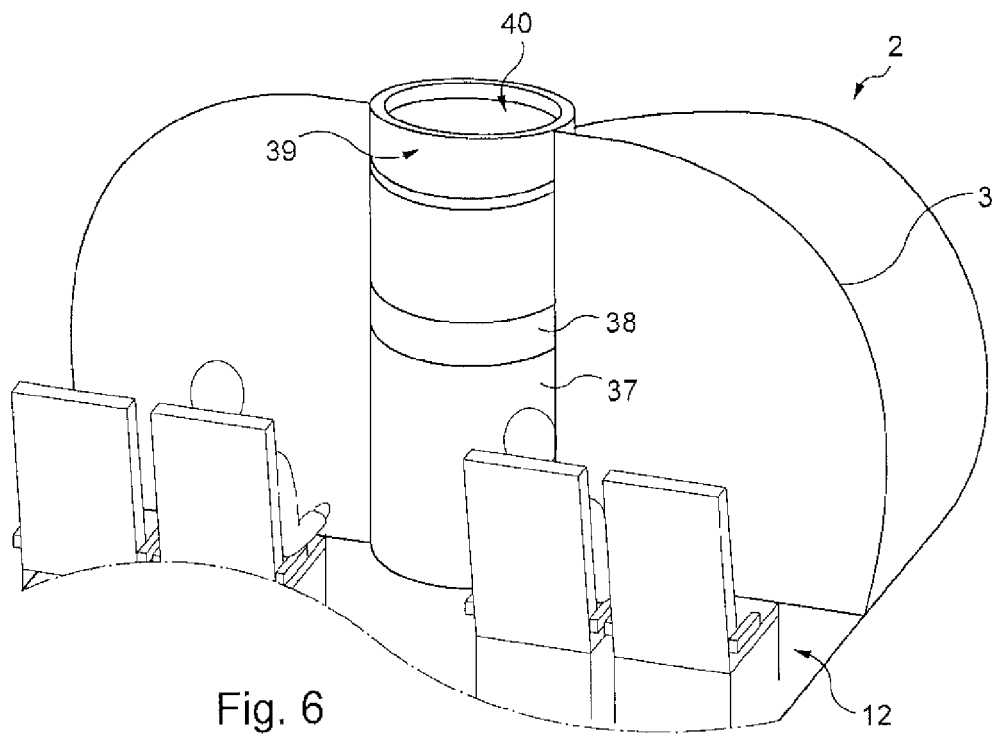
FIG. 6 shows a perspective view from the passenger cabin space of the access door in FIG. 3.

FIG. 6 shows a diagrammatic perspective view of the inside of an airliner equipped with a secured vestibule according to the invention. The secured vestibule is then in the position allowing a crew member present in the cockpit 2 to enter the access door. On the side of the passenger cabin 12, the access door has a partition having a general shape of a portion of cylinder 37 which is arranged in perfect juxtaposition with the armoured separating wall 3 between the cockpit and the passenger cabin 12.

The outer mobile partition 37, and an inner mobile partition not shown in FIG. 6, are mounted on an upper cylindrical ring 39 arranged close to the ceiling of the aircraft cabin. As will be explained below, the ceiling upper cylindrical ring 39 cooperates with a hatch 40 allowing upward evacuation from the inside 22 of the access door (see FIG. 4) to the outside of the access door through the ceiling.

An annular projection 38, arranged substantially at shoulder height of an occupant of the access door, protects an inner grasping ring (not shown in FIG. 6) of the outer partition 37.

Figures 13, 14, 15:
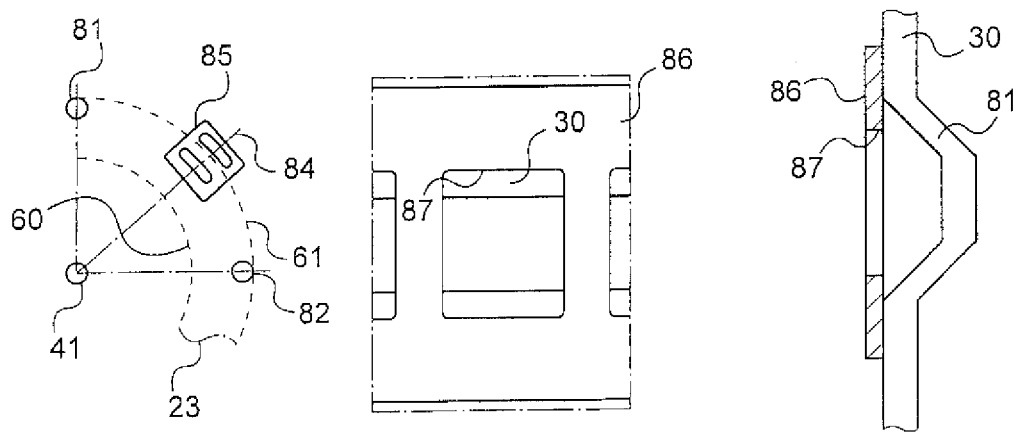

Said grasping ring fixed to the partition 37 allows the occupant of the access door to rotate the partition 37 after the latch of this partition has been unlocked. A detail of the inner ring is shown in FIGS. 14 and 15.

It will be noted that in this configuration the passenger seats in the first row, in particular those arranged along the aisle of the cabin, can still be used when the access door of the invention is placed in the central opening of the armoured wall 3.

Figure 7:
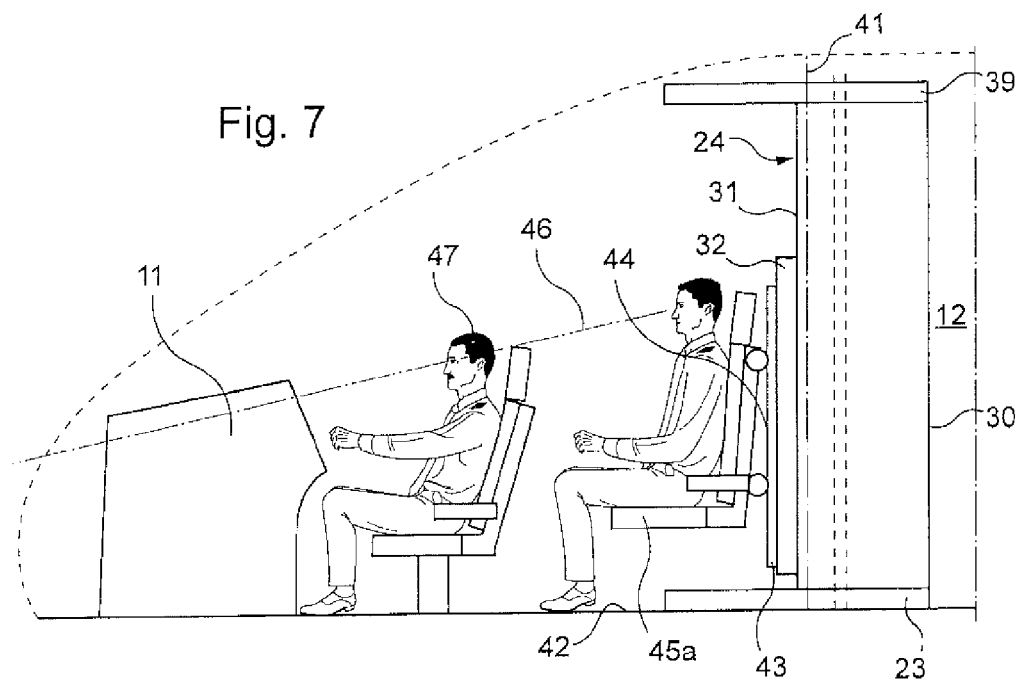
FIG. 7 shows a first use of an access door in FIG. 4 equipped with an additional jump seat.

FIG. 7 shows a first use of the secured vestibule according to the invention in which a jump seat 45*a* has been suitably fixed on the support plate 32. The support plate 32 is shown mounted on one of the free edges of the inner cylindrical partition 31 and locked on the opposite free edge of the partition 31 by a locking system. Here, the jump seat 45*a* is accessible for a member of the crew in the cockpit 2.

Three seats are thus made available in the rear part of the cockpit, namely the jump seats 45*b* and 45*c* on either side of the access door and the jump seat 45*a* on the access door itself.

In FIG. 7 the secured vestibule of the invention comprises the lower circular ring 23, which is centred about an axis that is the common axis of rotation 41 of the access door and is mounted on the floor 42. The access door also comprises an upper circular ring 39 having the same axis 41 and which is fixed to the ceiling. The outer cylindrical partition 30 is in the locked position on the side of the passenger cabin 12, while the opening 24 arranged between the partition 30 and the inner partition 31 is closed by the support plate 32. The jump seat 45*a* is mounted on a vertical track 43 joined together with the support plate 32. Connecting carriages 44 between the jump seat and the track 43 allow the height adjustment of the jump seat 45*a*.

Due to the central position of the secured vestibule, the occupant of the jump seat 45*a* can move the latter upwards by sliding on the track 43, so as to have the same line of sight 46 as the pilots (like the pilot 47) through the canopy, above the navigation station 11. He will then be able to give the pilots the benefit of his observations at the same time as their own.

Figure 8:
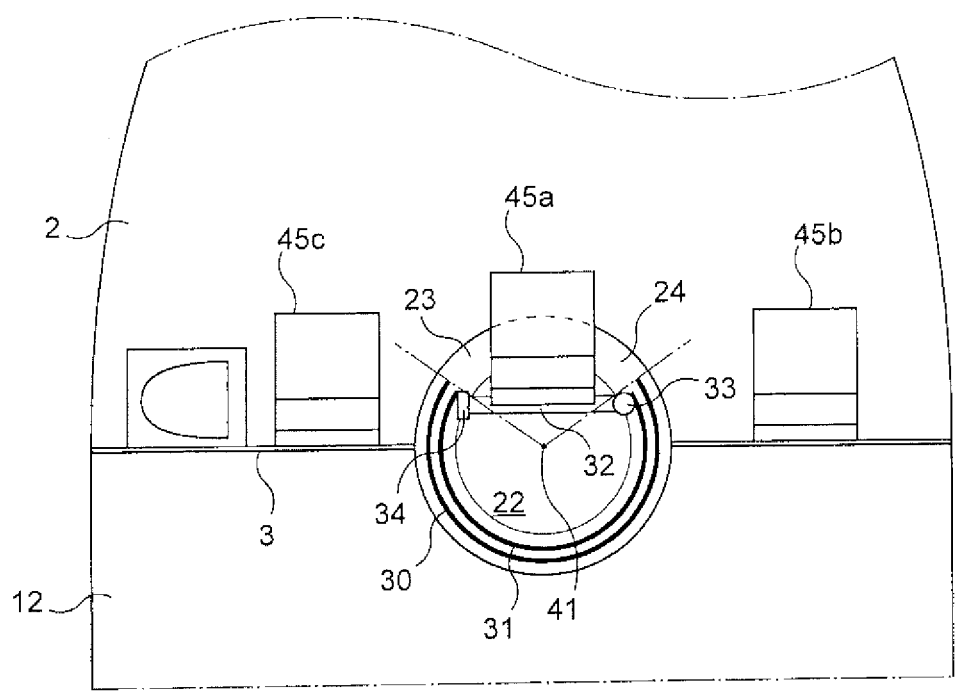
FIGS. 8 and 9 show a second use of the access door in FIG. 4.

FIG. 8 shows a top of view of the secured vestibule with its opening 24 oriented to the side of the cockpit 2. The jump seat 45*a* is in the open position against the support plate 32 which is secured to the inner mobile partition 31. In an embodiment, when the access door is locked in the position in FIG. 8 on the side of the cockpit 2, the opening 24 of the access door is closed or isolated from the cockpit by a curtain (not shown). The occupant of the jump seat 45*a* can then adjust the vertical tilt of the support plate 32 in the access door and/or of the jump seat 45*a* in order to change to a reclining or semi-reclining so-called relaxation position. A sort of secluded rest room is thus made available in the cockpit 2 extended by the access door. It will be noted that the support plate fixed to the inner partition can be arranged further inside the access door so as to leave more usable inner space for the occupant of the jump seat. The latter can then be further hidden by the curtain closing the opening 24.

Figure 9:
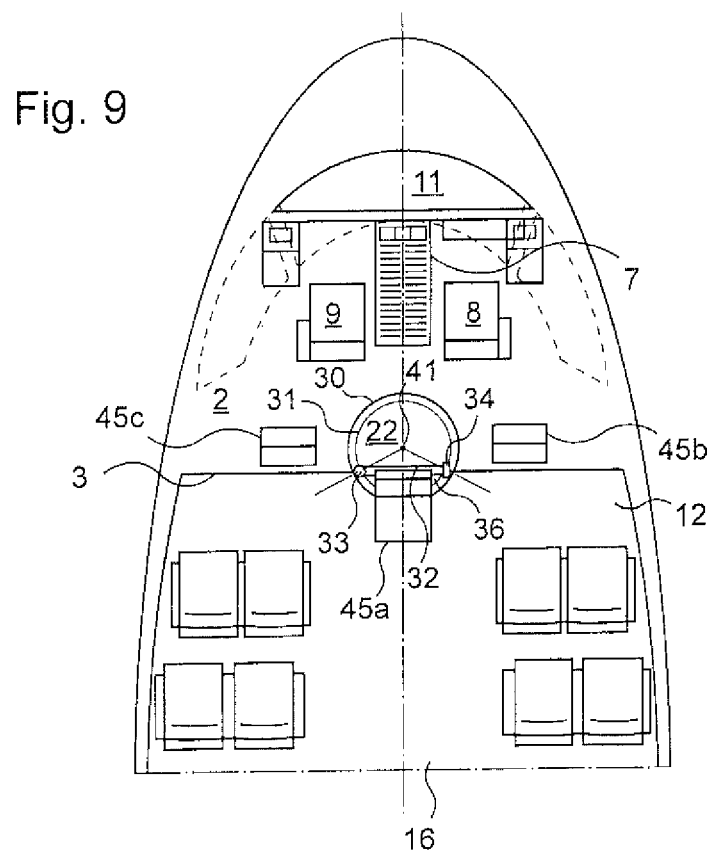

FIG. 9 shows the same elements as in FIGS. 7 and 8. However, the access door has been displaced by a relative rotational movement between the partitions 30 and 31 so as to form between them an opening 36 communicating with the passenger cabin 12. The jump seat 45a can then be used, for example during a take-off or landing phase, by a flight attendant seated in the aisle 16.

Figure 10:
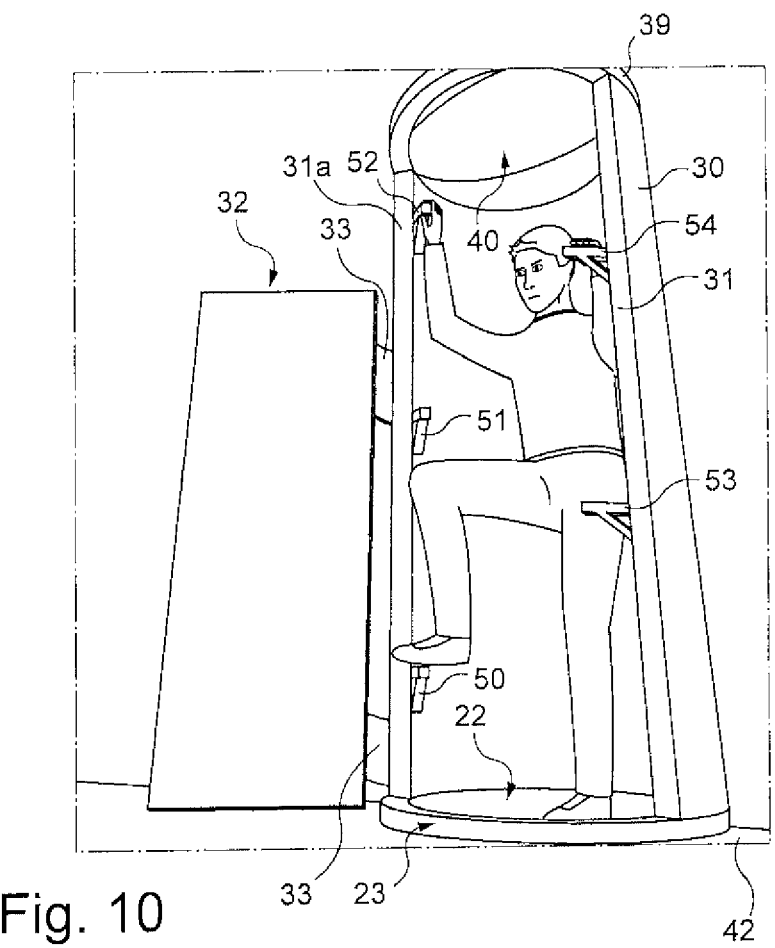
FIG. 10 is a perspective view of another embodiment of the access door according to the invention used as an emergency exit for the cockpit.

FIG. 10 shows a particular embodiment of the secured vestibule of the invention. The access door is seen in the cockpit-side open position.

The support plate 32 mounted articulation on a free edge 31a of the inner mobile partition 31 (via the articulation(s) 33) is shown in the open position outside the access door. The occupant positioned in the central space 22 has available support elements such as steps, for example folding steps, like steps 50-54 arranged on the two free edges of each side of the opening 24. The steps or support elements can be used to climb and access the hatch 40 arranged in the ceiling in order to escape from the cockpit. These support elements are distributed over almost the entire height of the partition 31. The arrangement provides an evacuation option for the crew, in particular on the ground, when the passenger cabin is no longer accessible for safety or other reasons.

Each step 50-54 is for example mounted on a articulation that allows it to be folded back inside the inner mobile partition 31, in order to avoid obstructing the passage in the opening of said partition.

It will be noted that the steps or other support elements with the same purpose can be arranged in staggered rows and positioned at other locations on the inside face of the inner partition 31.

It will be noted that in FIG. 10, the central space 22 of the secured vestibule is not integral with the lower cylindrical ring 23 but, on the contrary, is integral with the floor 42. This arrangement allows the weight of the occupant of the access door to be supported not by the mobile part of the access door but by the floor itself. Moreover, this arrangement makes it possible to adapt the access door to a conventional aircraft environment and allows for the access door to be installed and removed economically and simply.

Figure 11:
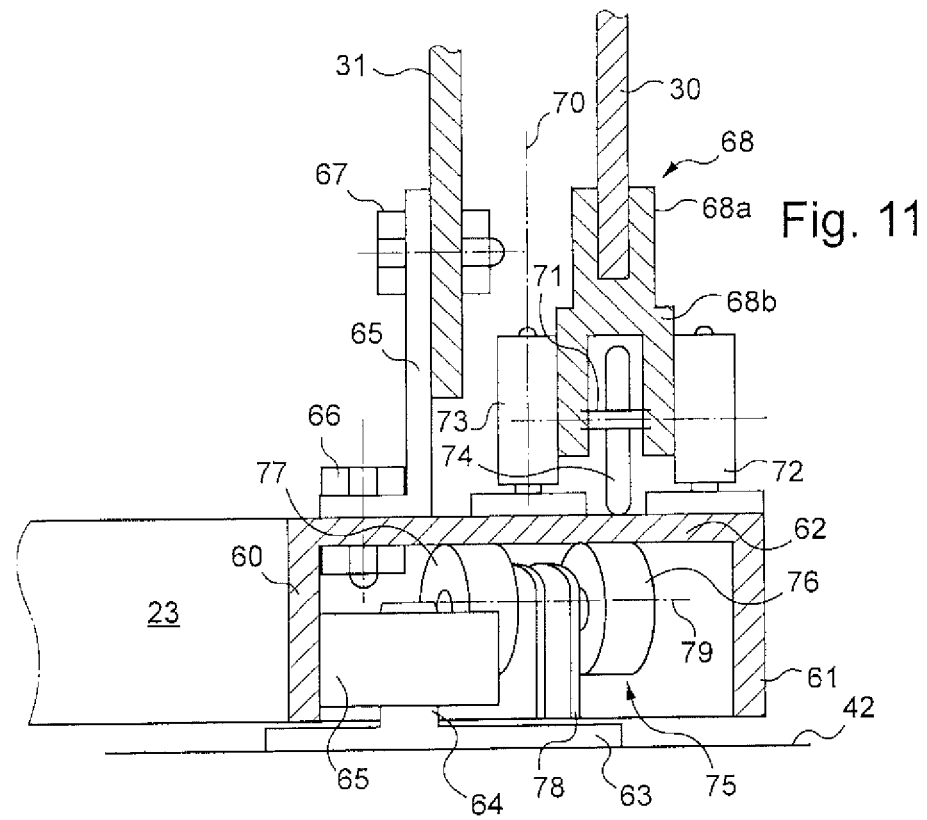
FIGS. 11 to 15 are diagrams of embodiments of parts of the access door in the preceding figures.

FIG. 11 shows a partial radial cross-sectional view with respect to the common axis of the access door of a particular embodiment of the link between the lower circular or cylindrical ring 23 and the lower portion of the rotatably mobile partitions 30, 31.

The ring 23 has a shape having rotational symmetry about the common axis of rotation 41 and has a cross-section in a radial plane having the shape of an inverted U.

The inner mobile partition 31 is joined together with a horizontal portion 62 (base wall of the inverted U) of the ring 23 via brackets angularly distributed on the periphery of the partition, such as the bracket 65. The bracket 65 is joined together with the horizontal portion 62 of the ring 23 via a bolt 66 fixed at one end. A bolt 67 allows the other end of the bracket 65 to be joined together with the base of the inner mobile partition 31.

An element 68, for example made of metal material, having a generally cylindrical shape, has two portions 68a, 68b arranged back to back, each having a U-shaped radial cross-section, defining a recess oriented in the opposite direction to the other recess. The recess of the U-shaped upper part 68a serves to receive the lower edge of the outer mobile partition 30. The recess of the lower portion is in the shape of an inverted U and receives a series of rollers such as the roller 74 having a radial horizontal axis 71 and fixed between the descending vertical arms of the portion 68b. The rollers enable the partition 30 and support element 68 assembly to run on the horizontal portion 62 of the cylindrical ring 23 in a grooved track arranged on the surface thereof. Moreover, the vertical arms of the portion 68b are held captive by rollers 72, 73 having a vertical axis 70 and which are joined together with the same horizontal portion 62 of the cylindrical ring 23.

In order to provide the rotation of the cylindrical ring 23 about the common axis 41 of the access door which constitutes an axis of rotation for the two inner 31 and outer 30 partitions, the cylindrical ring 23 is mounted a very short distance above the floor 42. The ring 23 can turn about this common axis by means of guide rollers like the roller 65 fixed by a shaft 64 on a base 63 fixed to the floor 42. The guide roller 65 is in contact with an inner cylindrical wall 60 of the inverted U-shaped profile of the cylindrical ring 23.

The guide roller 65 can alternatively be arranged inside the inverted U along the outer wall 61 of the cylindrical ring 23. The radial cross-sections of the inner 60 and outer 61 vertical walls form the arms of the inverted-U profile.

Moreover, the cylindrical ring is supported vertically by a pair 75 of bearing rollers that comprise two rollers 76 and 77 mounted on a common support 78 via a horizontal shaft. The common support of the rollers 76 and 77 is joined together with the floor of the cabin.

The same arrangement can be implemented fully or partially on the upper ring 39 (FIGS. 7 and 10), as well as or instead of the arrangement on the ring 23.

Figure 12:
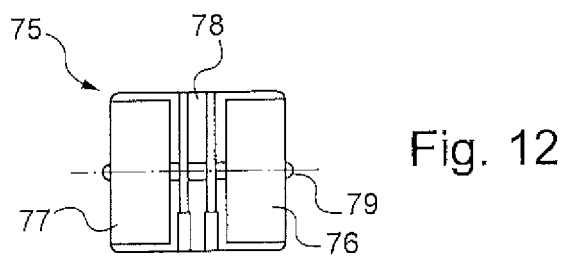

FIG. 12 shows a top view of the pair of bearing rollers 76, 77 in FIG. 11 both mounted rotating freely about the radial shaft 79 passing through the support 78 from one side to the other. The radial shaft 79 is perpendicular to the common axis 41.

FIG. 13 shows a top view diagram of the assembly in FIG. 11. Only a quarter of the cylindrical ring 23 is shown.

Guide rollers 81 and 82 are shown (similar to the roller 65 in FIG. 11) placed at 90 degrees to each other about the common central axis 41 of the access door and bearing against the outer wall 61 (dashed line) of the inverted U of the ring 23. On the bisecting line between the radii bearing the guide rollers 81 and 82, a radius 84 is shown with which is aligned the axis of a pair of bearing rollers 85 reproducing the structure in FIG. 12.

FIGS. 14 and 15 show respectively a partial front view and a cross-sectional side view of means allowing the operation of the outer partition 30. The outer partition 30 has a convex area 81 oriented towards the outside of the partition (shown in FIG. 6 under reference 38) and a ring 86 fixed to the inner face of the partition 30, passed through by grasping holes such as the hole 87. Said arrangement thus makes it possible for the occupant of the central space 22 of the access door to turn the outer partition 30 when the latter is unlocked.

The invention claimed is:

1. A secured vestibule allowing communication between several aircraft compartments, the secured vestibule being installed in an area of the aircraft situated between a first compartment and at least a second compartment, the secured vestibule comprising two mobile partitions in the form of concentric portions of cylinders, each of the partitions being capable of independent movement about a common axis, so as to form between the partitions a single opening which, depending on the relative position of the partitions, gives access to one or other of the compartments, the two partitions being capable of moving on two concentric cylinders having different diameters.

2. The secured vestibule according to claim 1, wherein the partitions are capable of describing a range of movement extending through 360°.

3. The secured vestibule according to claim 1, wherein the portions of cylinders each extend through an angular sector of more than 180°.

4. The secured vestibule according to claim 1, comprising a double wall closing off access to the first compartment or the second compartment depending on the position of the mobile partitions with respect to the compartments.

5. The secured vestibule according to claim 1, wherein the mobile partitions can be operated by a user.

6. The secured vestibule according to claim 1, wherein the mobile partitions are linked to support means permitting independent rotational movements of each partition about the common axis.

7. The secured vestibule according to claim 6, wherein the support means of the mobile partitions comprise at least one cylindrical ring that is capable of turning about the common axis of the access door with respect to a floor or a ceiling of the aircraft.

8. The secured vestibule according to claim 7, wherein said at least one cylindrical ring is mobile in rotation with respect to the floor and/or to the ceiling using guide and/or bearing rollers fixed to the floor or the ceiling of the aircraft.

9. The secured vestibule according to claim 6, wherein one of the mobile partitions is capable of moving with respect to said at least one cylindrical ring using guide means joined together with said at least one ring.

10. The secured vestibule according to claim 1, comprising first and second mobile partitions that engage with means for locking their rotational movements about the common axis, the locking means being activated by control means ensuring that only a single partition is rendered mobile until the access opening to one of the compartments is completely clear.

11. The secured vestibule according to claim 1, wherein one of the mobile partitions is equipped with an articulation allowing a plate to be fixed in an articulated manner to the access door and to deploy said plate outside the access door or fold the plate back towards the access door.

12. The secured vestibule according to claim 11, wherein the plate is a support plate that comprises a seat.

13. The secured vestibule according to claim 12, wherein the seat is joined together with the support plate using tracks and/or articulations allowing height and/or tilt to be adjusted.

14. The secured vestibule according to claim 2, wherein at least one of the mobile partitions is provided with support elements distributed height wise over the partition in order to allow access to an escape hatch situated in the upper part of the access door.

15. An aircraft comprising at least one secured vestibule according to claim 1.

* * * * *